United States Patent [19]

Rajashekara et al.

[11] Patent Number: 5,594,634
[45] Date of Patent: *Jan. 14, 1997

[54] DC LINK INVERTER HAVING SOFT-SWITCHED AUXILIARY DEVICES

[75] Inventors: Kaushik Rajashekara, Carmel; Alexander Kurnia, Indianapolis, both of Ind.

[73] Assignee: General Motors Corporation, Detroit, Mich.

[*] Notice: The term of this patent shall not extend beyond the expiration date of Pat. No. 5,592,371.

[21] Appl. No.: 443,306

[22] Filed: May 17, 1995

[51] Int. Cl.⁶ .................................................. H02M 7/44
[52] U.S. Cl. ............................................. 363/98; 363/132
[58] Field of Search ...................... 363/37, 41, 95, 363/97, 98, 131, 132; 318/800, 801, 803

[56] References Cited

U.S. PATENT DOCUMENTS

| | | | |
|---|---|---|---|
| 4,730,242 | 3/1988 | Divan | 363/37 |
| 4,833,584 | 5/1989 | Divan | 363/37 |
| 4,864,483 | 9/1989 | Divan | 363/37 |
| 4,965,709 | 10/1990 | Ngo | 363/37 |
| 5,055,992 | 10/1991 | Cook | 363/98 |
| 5,111,374 | 5/1992 | Lai et al. | 363/37 |
| 5,155,675 | 10/1992 | Maruyama et al. | 363/98 |
| 5,172,309 | 12/1992 | Dedoncker et al. | 363/132 |
| 5,317,248 | 5/1994 | Utley et al. | 318/811 |
| 5,361,196 | 11/1994 | Tanamachi et al. | 363/98 |

OTHER PUBLICATIONS

D. M. Divan, "The Resonant DC Link Converter—A New Concept in Static Power Converstion", *IEEE* 1986, pp. 648–656.
R. W. DeDoncker, J. P. Lyons, "The Auxiliary Resonant Commutated Pole Converter" *IEEE* 1990 pp. 1228–1235.
R. W. DeDoncker, J. P. Lyons, "The Auxiliary Quasi–Resonant DC Link Inverter" *IEEE* 1991 pp. 248–253.

*Primary Examiner*—Matthew V. Nguyen
*Attorney, Agent, or Firm*—Vincent A. Cichosz

[57] ABSTRACT

A DC Link for use with a multi-phase DC to AC converter provides soft-switch opportunities to the main inverter devices only when such opportunities are required. A quasi-resonant rail swings from source to ground potential either with or without the assistance of an auxiliary switch. The quasi-resonant rail swings from ground to source potential with the assistance of an auxiliary switch. Low switch stresses are characteristic in both the main inverter switch devices and the DC link switch devices. Main power is carried predominantly through a DC link switch thereby minimizing power handling requirements of DC link reactive components.

14 Claims, 5 Drawing Sheets

DC LINK INVERTER HAVING SOFT-SWITCHED AUXILIARY DEVICES

BACKGROUND

The present invention relates to a DC link inverter. More particularly, the invention is concerned with a naturally clamped quasi-resonant DC link topology for providing soft switching opportunities for an inverter sourced by the DC link.

Several types and variations of DC link topologies are known. For example, resonant DC links (RDCL) are known which provide zero voltage switching opportunities for the inverter devices. Such topologies provide for soft switching by supplying a continually resonating DC bus voltage. However, such topologies exhibit undesirable characteristics of elevated voltage stresses in the inverter devices of up to approximately two times the unit input voltage of the DC link. This is due to the peak voltages of the resonating DC link of up to approximately two times the unit input voltage of the DC Link. Another topology, the actively clamped resonant DC link (ACRDCL), may reduce these stresses to approximately 1.4 to 1.7 times the unit input voltage but requires a clamping device operative at the resonant frequency—typically an order of magnitude greater than the inverter switching frequency—thereby resulting in significant switching losses. In either the RDCL or ACDCRL topology, a resonant inductor element is required to carry the full load current resulting in massive hardware particularly in high power applications. Furthermore, since the inverter devices switch substantially synchronously with the resonating DC bus, the output of the RDCL or ACRDCL inverter will be an integral multiple of the DC bus pulses thereby limiting current control precision available from such a topology.

Another type of DC link topology includes the auxiliary resonant commutated pole (ARCP). Such a topology comes with significant hardware penalties—most notably as applied to multi-phase systems—owing to the phase dedicated nature of the hardware. In other words, each phase of a multi-phase system requires an identical set of auxiliary switching devices and resonant components dedicated thereto. Control complexity for such topologies correlate positively to the hardware complexity.

Yet another DC link topology includes an auxiliary quasi-resonant DC link (AQRDCL). While certain drawbacks (e.g. high voltage stresses on inverter devices and continuous pulsing DC bus) of the previously mentioned topologies are solved by the AQRDCL topology, such a topology suffers from some characteristic drawbacks. For example, trade-offs among the necessity of maintaining charge balance between DC bus capacitors, minimizing DC bus clamping time and managing current stress on upper clamping devices, especially at low link currents are inevitable unless a split DC input voltage supplies the DC link. It is also necessary that the controller anticipate the future link current after the inverter devices undergo a state change, resulting in additional control complexity. Furthermore, regenerative operation of such topology generally is not considered practical owing to the complexity of associated control.

SUMMARY

A DC link in accordance with the present invention is characterized by a DC source at an input of the DC link and a quasi-resonant DC output. The quasi-resonant output is controlled to one of substantially the DC source voltage or substantially zero voltage. Therefore, the DC link provides power delivery intervals and power interrupt interval to the device coupled at the DC output. The DC input comprises a positive DC rail and a negative DC rail. The DC link output comprises a quasi-resonant rail and the negative DC rail. The negative DC rail is common to the DC link input and output.

A first controlled clamping switch is connected between the positive DC rail and the quasi-resonant rail. A second controlled clamping switch is connected between the quasi-resonant rail and the negative DC rail. Associated with each of the first and second clamping switches is a respective antiparallel diode and capacitor coupled thereacross. A first auxiliary switch is connected between the positive DC rail and a first end of a series coupled resonant inductor and capacitor (series LC). The second end of the series LC is coupled to the quasi-resonant rail. An anti-parallel diode is coupled across the first auxiliary switch.

According to one aspect of the invention, during periods of high load current a power interrupt interval is carried out as follows. The first clamping switch is commanded off to thereby unclamp the quasi-resonant rail from the positive DC rail and shunt the current formerly sourced therethrough to the capacitors associated with the first and second clamping switches. This allows the quasi-resonant rail voltage to swing toward the negative DC rail voltage. When the quasi-resonant rail voltage reaches the negative DC rail voltage, it attempts to overshoot the negative DC rail voltage and the anti-parallel diode associated with the second clamping switch becomes forward biased to thereby clamp the quasi-resonant rail voltage at substantially the negative DC rail voltage. The load current, exclusively, now circulates through the diode associated with the second clamping switch. During the time while the quasi-resonant rail is at substantially the negative DC rail voltage by virtue of the forward biased diode associated with the second clamping switch, the second clamping switch is commanded on thereby effectuating soft switching thereof. It is during the period when the quasi-resonant rail is clamped to the lower negative DC rail that the output voltage of the DC link is substantially zero volts thereby providing a power interrupt interval appropriate for soft switch commutation of an inverter, or other DC supplied device, coupled at the output of the DC link.

In accordance with another aspect of the present invention, a second auxiliary switch is connected between the first end of the series LC and the negative DC rail, and an anti-parallel diode is connected thereacross. During periods of low load current a power interrupt interval is carried out by first commanding on the second auxiliary switch to thereby energize the series LC. At a certain time after commanding on the second auxiliary switch, the first clamping switch is commanded off to thereby unclamp the quasi-resonant rail from the negative DC rail and shunt the current formerly sourced therethrough (i.e. the series LC current and the load current) to the capacitors associated with the first and second clamping switches. After the quasi-resonant rail reaches the negative DC rail voltage, it attempts to overshoot the negative DC rail voltage and the anti-parallel diode associated with the second clamping switch becomes forward biased to thereby clamp the quasi-resonant rail voltage at substantially the negative DC rail voltage. The diode associated with the second clamping switch now carries the load current and the series LC current which freewheels back through the second auxiliary switch. During the time while the quasi-resonant rail is at substantially the negative DC rail voltage by virtue of the forward biased diode associated with the second clamping switch, the second clamping switch is commanded on thereby effectuating soft switching thereof. It is during this period, when the quasi-resonant rail is clamped to the lower negative DC rail, that the output voltage of the DC link is substantially zero volts thereby providing a power interrupt interval appropriate for soft switch commutation of an inverter, or other DC supplied device, coupled at the output of the DC link.

The series LC current eventually resonates through zero and reverses direction thereby forward biasing the diode associated with the second auxiliary switch. The series LC current increasingly sources the load current as the series LC current continues to increase, thereby supplanting the current through the anti-parallel diode associated with the second clamping switch. When the series LC current exceeds the load current, the diode associated with the second clamping switch becomes reverse biased, and the series LC current in excess of the load current freewheels back through the second clamping switch The second auxiliary switch is commanded off after the reversal of the series LC current forward biases the diode associated therewith, the forward biased diode thereby providing soft switching thereof.

After the DC link and inverter devices have completed switching, it is desirable to swing the quasi-resonant rail back up to the positive DC rail voltage to thereby establish a power delivery interval. For either low or high load currents, the power delivery interval is carried out by first commanding on the first auxiliary switch to thereby energize the series LC. The series LC current increasingly sources the load current, thereby supplanting the current through the anti-parallel diode associated with the second clamping switch. When the series LC current exceeds the load current, the diode associated with the second clamping switch becomes reverse biased, and the second clamping switch becomes conductive and sinks the series LC current in excess of the load current.

At a certain time after commanding on the first auxiliary switch, the second clamping switch is commanded off to thereby unclamp the quasi-resonant rail from the negative DC rail and shunt the current formerly sourced therethrough (i.e. the series LC current in excess of the load current) to the capacitors associated with the first and second clamping switches. After the quasi-resonant rail reaches the positive DC rail voltage, it attempts to overshoot the positive DC rail voltage and the anti-parallel diode associated with the first clamping switch becomes forward biased to thereby clamp the quasi-resonant rail voltage at substantially the positive DC rail voltage. The series LC current continues to source the load current with any current in excess thereof freewheeling back through the diode associated with the first clamping switch. During the time while the quasi-resonant rail is at substantially the positive DC rail voltage by virtue of the forward biased diode associated with the first clamping switch, the first clamping switch is commanded on thereby effectuating soft switching thereof. The series LC current eventually decreases below the load current, and the diode associated with the first clamping switch becomes reverse biased. The first clamping switch therefore becomes conductive and increasingly sources the load current as the series LC current continues to decrease. The series LC current ultimately reverses and freewheels through the first clamping switch and diode associated with the first auxiliary switch until it decays to zero. The first auxiliary switch is commanded off within the freewheel time, the forward biased diode associated with the first auxiliary switch thereby providing soft switching thereof.

DETAILED DESCRIPTION OF THE DRAWINGS

Figure 1:
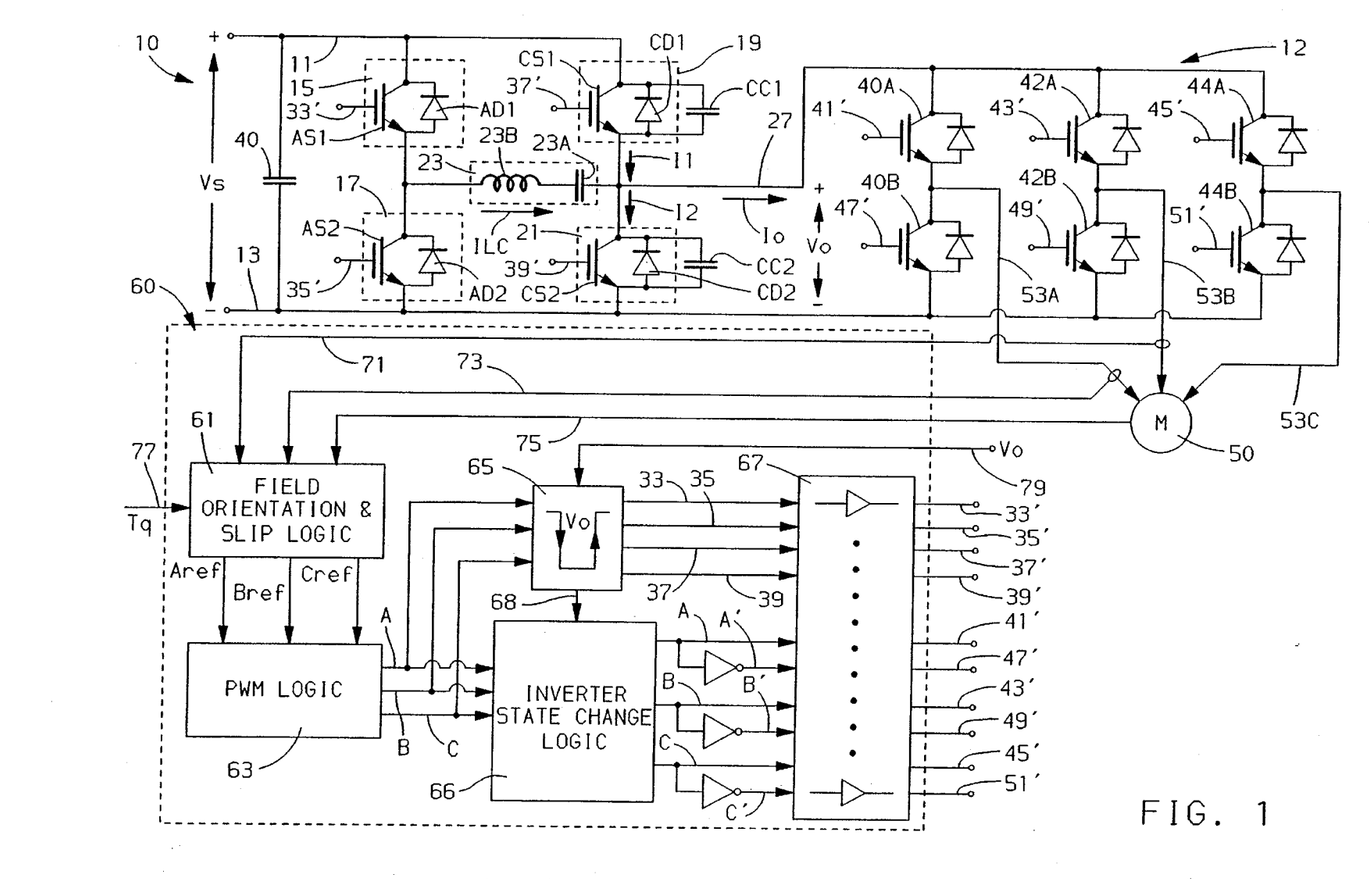
FIG. 1 illustrates schematically a first embodiment of a DC link in association with an inverter coupled thereto.

Beginning first with FIG. 1, a first embodiment of a DC link in accordance with the present invention is illustrated in conjunction with an inverter coupled to its output to supply a multi-phase AC load. Numeral 10 generally designates the DC link having a DC source voltage $V_s$ toward the left of the illustration and a DC output voltage $V_o$ illustrated between the DC link 10 and the inverter 12. DC source voltage $V_s$ may be for example a rectified AC line voltage or a pure DC source voltage such as is available with single or multiple battery cells. Source capacitor 40 is illustrated between the positive DC rail 11 and negative DC rail 13 and serves to ensure the power quality between the positive DC rail and negative DC rail. A pair of auxiliary switching devices 15 and 17 are shown connected in series with each other between the positive DC rail and the negative DC rail. Each of the switching devices 15 and 17 comprises respective solid state auxiliary switches AS1 and AS2 with respective associated anti-parallel auxiliary diodes AD1 and AD2. The combined solid state auxiliary switch and antiparallel diode are found in conventional IGBT power switching devices or may be fabricated of individual elements as appropriate. A pair of clamping switch devices 19 and 21 are likewise connected in series between the positive DC rail 11 and the negative DC rail 13. Similarly, these clamping switch devices 19 and 21 respectively comprise solid state clamping switches CS1,CS2 with associated anti-parallel clamping diodes CD1,CD2. Again, conventional IGBT power switching devices package both the solid state clamping switch and anti-parallel diode in a single unit. Appropriate gate drive signals are applied to gates of the auxiliary and clamping switch devices at 33', 35' and 37', 39'.

Further associated with each of the clamping switch devices 19 and 21 is a respective resonant capacitor CC1, CC2. Preferably, capacitors CC1,CC2 are substantially equivalent. Each of these respective capacitors is connected across the associated switching element. The node between the two clamping switch devices 19 and 21 is coupled to one end of resonant capacitor 23B, the other end of the capacitor being coupled to one end of resonant inductor 23A. The other end of resonant inductor 23A is coupled to the node between the auxiliary switch devices 15 and 17. Together, the series coupled resonant inductor 23A and resonant capacitor 23B comprise what shall be referred to hereafter as the series LC 23. Further, the node between the clamping switch devices 19 and 21 is coupled to the quasi-resonant rail 27.

The output voltage $V_o$ between quasi-resonant rail 27 and negative DC rail 13 also comprises the input to inverter 12. As can be seen in FIG. 1, quasi-resonant rail 27 provides the positive DC bus input to inverter 12 and the negative DC rail 13 provides the negative DC bus input to inverter 12. The inverter as shown in the present embodiment is a conventional three-phase DC to AC converter having a plurality of inverter switch devices 40A, 40B, 42A, 42B, 44A, and 44B. A three-phase inverter is exemplary, it being understood that the present invention is equally applicable to any multi-phase inverter. Each inverter switch device comprises a solid state inverter switch and an associated anti-parallel diode. These two elements of each inverter switch device are preferably packaged together as previously mentioned.

Moving from left to right in FIG. 1 as it corresponds to inverter 12, inverter switch devices 40A and 40B are associated with a first output phase 'A', inverter switch devices 42A and 42B are associated with a second output phase 'B', and inverter switch devices 44A and 44B are associated with a third output phase 'C'. Appropriate gate drive signals are applied to gates of the switching elements at 41', 43', 45', 47', 49' and 51'. Phase outputs for supplying a load are provided by lines labelled 53A, 53B, and 53C, the alphabetic suffix corresponding to the particular output phase associated therewith.

The load shown associated with the inverter in the present embodiment is a three-phase motor 50 such as a three phase AC induction machine having application as a motive drive in an electric or hybrid road vehicle. The embodiments illustrated are described with respect to this particular load and vehicular application. Of course, the load is offered by way of example and not of limitation, it being understood that the number of phases of the load will correspond to the number of phases of the multi-phase inverter coupled to the DC link. Also, an AC induction machine is an exemplary load, it further being understood that other multi-phase load applications, for example permanent magnet motors, are within the scope of application of the present invention.

Numeral 60 in the Figure illustrates generally a control for the DC link and the inverter switches. In operation, the control 60 is required to establish a rotating magnetic field in the stator of the machine 50. It is most desirable that the current supplied to the stator windings is substantially sinusoidal, and a preferred manner of accomplishing this goal is to pulse width modulate the inverter switches at a relatively high frequency (such as 20 khz). This may be accomplished by discreet digital and/or analog circuit elements such as reference SIN and triangle wave generators and comparators. Controller 60 is preferably a microprocessors based controller in which the inverter conduction patterns are stored in nonvolatile memory as a function of rotor position and requested current amplitude. An exemplary digital control for inverter conduction patterning is shown in U.S. Pat. No. 5,317,248 to Utley et al. and assigned to the assignee of the present invention. It is noted, however, that the precise inverter control will vary with type of load and application and any inverter control may be utilized in conjunction with the present invention.

Blocks 61, 63, 65 and 66 are representative of functional blocks of logic processing for establishing both the inverter gate drive signals at 41'–51' as well as the DC link gate drive signals at 33'–39' in accordance with the present invention. Inputs to controller 60 include at least two phase reference signals on lines 71 and 73 which in the present embodiment are illustrated as current sense signals derived from legs 53A and 53B of the inverter outputs by well known current sensors. Additionally, a rotor angle signal on line 75 is derived from a conventional encoder (not shown) which would be mechanically coupled to the rotor in the motor to thereby provide periodic electric pulses on line 75 at a frequency based on rotor displacement. The inverter output amplitude is determined in response to a demand signal such as a torque command signal on line 77 illustrated at the left of controller 60. The torque command signal may be derived for example from an operator input such as through an accelerator pedal position in a well known manner. The stator angle is determined as a combined function of the rotor position information provided by the encoder on line 75 and a desired slip of the machine. The magnitude of the slip may be fixed, while its sign depends on whether the machine is operating as a motor or a generator. DC link output voltage $V_o$ is also input via line 79 by well known voltage sensing means.

Block 61 represents motor/generator logic which determines whether the machine 50 should be operating in the motoring or generating mode. In an automotive installation, this may be determined by monitoring the vehicle acceleration or application of the service brakes. The block 61 further determines the amplitude and slip commands, which amplitude is directly related to the demand signal input on line 77 while the slip command may be fixed or determined in relation to the required torque or the desired power output of the machine 50. The outputs from block 61 labeled Aref, Bref and Cref are representative of reference signals for the three phases A, B and C respectively. These are representative of phase signals and are shown being utilized by block 63 which represents the desired inverter gating signal generation logic.

Preferably, block 63 is representative of a pulse width technique; one such technique being pulse width control and another such control being pulse width modulation control. Pulse width control would be utilized where it is desirable to control the width of the output pulses supplied to the inverter switches to thereby control the inverter output voltage. Such a technique has certain disadvantages which become prevalent when the mean output voltage of the inverter decreases. The preferred technique therefore is classic pulse width modulation wherein the amplitude of the inverter output voltage is controlled by varying the ratio of the total on time of the pulses to total off time. Even within the pulse width modulation technique there are two approaches to accomplishing the desired inverter outputs; first, a constant pulse width may be maintained and the number of pulses per half cycle varied, or second, the pulse width may be varied for a constant number of pulses per half cycle. The precise inverter signal generation technique utilized is not critical to the present invention, there being many well known techniques for generating desired inverter outputs. However, as previously mentioned, the classic pulse width modulation is in this embodiment the most desirable. The output of block 63 is represented by three phase signals A, B and C.

These phase signals A, B and C are illustrated as inputs to block 66 which is representative of state change logic for the inverter switches. The outputs from block 66 essentially mirror the inputs A, B and C, each of the various output signals A, B and C further being branched off to provide inverted phase signals A', B' and C'. The main logic function represented by block 66 is that of a latching of the input signals A, B and C such that they are passed through at an appropriate time so that the inverter switch state changes are effectuated. This appropriate time is associated with a zero voltage input to the inverter such that low stress switching of the inverter switch devices is effectuated. Line 68 represents an enabling signal to allow the generated phase signals A, B and C to be passed through as outputs from block 66.

The phase signals A, B and C further comprise inputs to a block 65 which is representative of DC link gating signal generation logic. Essentially, when a change in any one of the phase signals A, B and C is detected by the logic represented in block 65, the output voltage $V_o$ therefrom is caused to resonate down to substantially the negative DC rail voltage thereby providing a zero voltage switching opportunity for the inverter switches. Line 68 as hereinbefore described, signals to the logic represented by block 66 when the swing to this lower rail has occurred. This being the case, the logic represented by block 66 allows for the state change to the inverter signals to be carried out. Output signals 33–39 from block 65 represent the logic level signals corresponding to the gating signals as applied to gates 33', 35', 37' and 39' respectively to control the associated switching elements of the DC link. Block 67 represents an array of output drivers and associated buffer circuitry as is well known in the art to provide appropriate gate drive signals from the logic signals. Each of the signals 33–39 from the DC link logic block 65 as well as the phase and inverted phase signals A, A', B, B', C and C' provide inputs to the array 67, the outputs therefrom providing appropriate signals to the respective DC link and inverter switching elements.

Figures 3A, 3B:
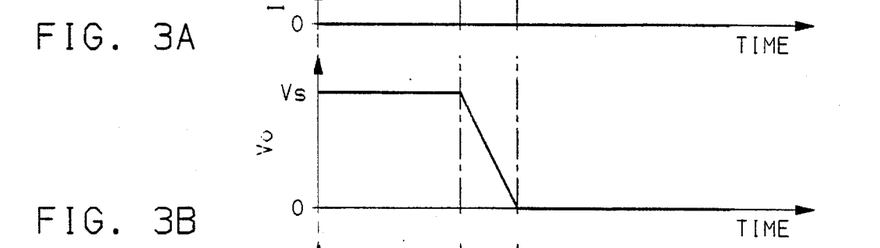
FIGS. 3A–3D illustrate various current and voltage signals associated with the DC link during high load currents and negative quasi-resonant rail swings.
Figure 3C:
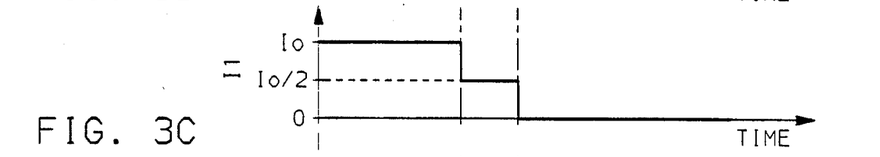
Figure 3D:
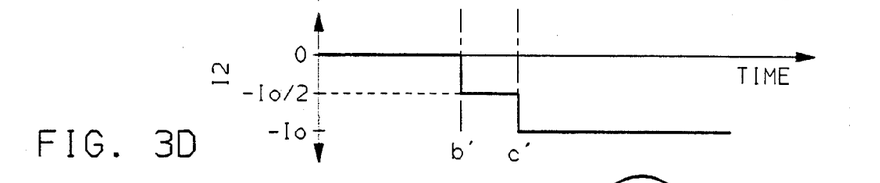

With reference now to FIGS. 3A–3D and FIGS. 6A–6D, operation of the DC link and control 60 in accordance with the present invention is further explained. FIGS. 3A–3D represent various current and voltage signals as they appear in portions of the circuit of the DC link. FIGS. 6A–6D represent the gating signals as applied to the various switching elements (AS1, AS2, CS1 and CS2) in the DC link to bring about the resultant current and voltage responses as represented in FIGS. 3A–3D. A high gating signal represents a 'command on' and a low gating signal represents a 'command off' of the corresponding DC link switching element. Furthermore, FIGS. 3A–3D are representative only of a portion of a full resonant cycle wherein the output voltage $V_o$ is brought down to substantially the negative DC rail voltage. FIG. 3A represents the series LC current $I_{LC}$ as shown in FIG. 1. FIG. 3B represents the output voltage $V_o$ as it appears across the resonant DC rail 27 and the negative DC rail 13. FIGS. 3C and 3D represent the current components $I_1$ and $I_2$ as labelled in FIG. 1. Current components $I_1$ and $I_2$ correspond to the summation of all currents carried by upper (CS1, CD1 and CC1) and lower (CS2, CD2 and CC2) components respectively.

The load current $I_o$, that is to say the current through the quasi-resonant rail 27 circulating through the inverter 12 and machine 50, is for analysis purposes assumed to be constant through the power interrupt interval. It can be appreciated that with respect to most inverter driven load applications, such as rotary machines, the load current $I_o$ is substantially constant since such loads are characteristically inductive. As can be appreciated from an examination of FIG. 1 and simple conventional nodal analysis thereof, the load current $I_o$ is equivalent to the series LC current $I_{LC}$ plus current component $I_1$ less current component $I_2$ ($I_o=I_{LC}+I_1-I_2$). Load current $I_o$ is not shown as a separate plot in FIGS. 3A–3D, however, it appears as appropriate as a portion of the various current components $I_{LC}$, $I_1$ and $I_2$ in further explanation.

Turning now to FIGS. 6A–6D, gating signals are shown which correspond to a power interrupt interval wherein the load current $I_o$ is adequate to overcome losses associated with the machine, inverter and DC link which otherwise would impede a full swing of the quasi-resonant rail 27 down to substantially the negative DC rail voltage without an addition of energy. These are referred to herein as high current interrupt intervals. It can be seen that at an initial time toward the left of the axes of the respective graphs of gating signals that clamping switch CS1 is the only one of the DC link auxiliary and clamping switches that is currently commanded on as represented by the high signal in FIG. 6C. The voltage across clamping switch CS1 therefore is substantially zero. Capacitor CC1 is discharged, both plates thereof being at substantially source voltage $v_s$. Capacitor CC2 is charged, the upper plate being at substantially source voltage $V_s$ and the lower plate being at substantially the negative DC rail voltage. It is assumed that a steady state power delivery interval is in effect and therefore clamping switch CS1 is conductive. This effectively DC couples the source voltage $V_s$ to the quasi-resonant rail 27. The load current $I_o$ delivered to the load driven by the present inverter state is equivalent to $I_1$ as illustrated in FIG. 3B.

At a time when it is appropriate to resonate the quasi-resonant rail 27 to the negative DC rail voltage (i.e., when any one of the phase signals A, B or C from block 63 changes state) clamping switch CS1 is commanded off at a time (b'). Since clamping switch CS1 at this point is conductive, commanding off thereof occurs at substantially zero voltage thereacross. The current formerly carried by clamping switch CS1 is shunted into the two capacitors CC1, CC2, thereby resulting in a decrease of the magnitude of the current component $I_1$ and an increase in the magnitude of the current component $I_2$. The output voltage $V_o$ swings linearly toward the negative DC rail voltage as capacitor CC1 charges and capacitor CC2 discharges. The voltage across the switching element CS1 increases at an acceptably low rate of substantially $dv/dt=I_o/C$, where C is the net combined capacitance of capacitors CC1, CC2.

With respect to high current interrupt intervals, the decrease of the output voltage $V_o$ is substantially linear between the times (b') and (c') which mark the beginning and end, respectively, of the quasi-resonant rails swing to lower voltage. At time (c'), clamping diode CD2 becomes forward bias as the quasi-resonant rail attempts to overshoot the negative DC rail voltage. This effectively clamps the quasi-resonant rail to substantially the negative DC rail voltage. Since the voltages across capacitors CC1, CC2 are no longer changing with time, the current therethrough each drops to zero. The currents formerly carried by capacitors CC1, CC2 are transferred to clamping diode CD2 as it is forward biased.

At any time substantially contemporaneous with or greater than time (c'), wherein the downward swing of the quasi-resonant rail is complete and clamping diode CD2 is forward biased, an inverter state change may be accomplished at substantially zero voltage across the inverter switching elements. Also, clamping switch CS2 is preferably commanded on to take advantage of the substantially zero voltage thereacross (one diode drop) and the zero current therethrough. This commanding on of the switching element CS2 can be observed in FIG. 6D at time (c'). Although commanding on of clamping switch CS2 does not need to occur immediately as the quasi-resonant rail reaches the negative DC rail voltage, it is necessary that it be commanded on while clamping diode CD2 is forward biased in order to maintain the objective of zero voltage/zero current switching thereof. With reference to FIG. 1, and in particular to the control 60, it can be seen that the link 68 between logic blocks 65 and 66 would, within the same time window for commanding on clamping switch CS2, indicate that it is appropriate to allow for the passage of phase signals A, B and C to the appropriate output drivers at block 67 to thereby cause the desired soft switching of the appropriate inverter switch devices.

In the present embodiment, it is preferred to determine the time (c') by estimating the time needed for the combined capacitance of capacitors CC1,CC2 to substantially fully discharge and charge, respectively, after commanding off clamping switch CS1. This is readily estimated as the output voltage $V_o$ is known to be a linear function of known quantities of load current $I_o$, capacitors CC1,CC2, and source voltage $V_s$, all of which quantities are known through direct sensing, calibration values and/or inverter control quantities. Although not necessary or preferred, such additional sensors as may be desired for direct measurement of current and voltage quantities may provide for sensed quantities for use in the determination of time (c').

During power interrupt intervals wherein the load current $I_o$ may not be sufficient to overcome the various system losses, it is desirable to catalyze the swing of the quasi-resonant rail 27 down to the negative DC link voltage. In such a situation, auxiliary switch AS2 is required to energize the series LC 23 to overcome these losses. FIGS. 7A–7D and FIGS. 4A–4D are representative of the appropriate control signals and of various currents and voltages respectively for this situation. The assumed initial conditions are similar to those preceding a high current interrupt interval inasmuch as clamping switch CS1 is conducting the entire load current (i.e. $I_1=I_o$). Current through the series LC is assumed to be zero and thus the voltage thereacross is zero, both ends thereof being at substantially the positive DC rail voltage by virtue of the conductive clamping switch CS1. Therefore, the voltage across auxiliary switch AS1 is assumed to be substantially zero and the voltage across auxiliary switch AS2 is assumed to be substantially source voltage $V_2$.

Figure 4A:
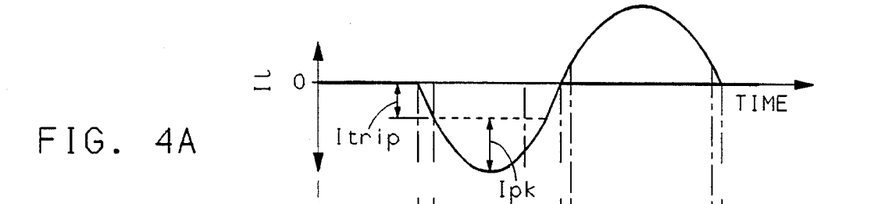
FIGS. 4A–4D illustrate various current and voltage signals during low load currents and negative quasi-resonant rail swings.
Figure 4B:
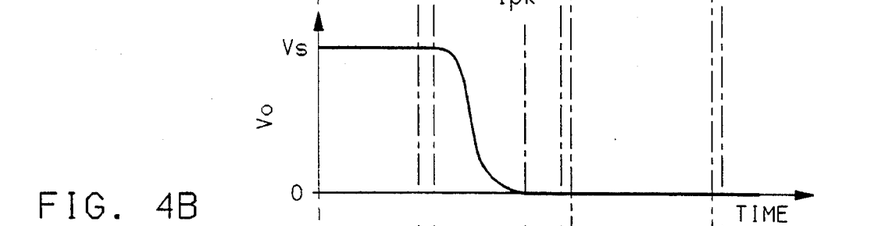

At a time (a), auxiliary switch AS2 is commanded on thereby pulling down the one end of the series LC 23 connected between the auxiliary switches AS1,AS2 to substantially zero volts. Auxiliary switch AS2 sinks the series LC current $I_{LC}$ as it increases negatively from zero as illustrated in FIG. 4A at an acceptably low sinusoidal rate. The series LC current $I_{LC}$ is sourced through clamping switch CS1 and additively contributes to the current component $I_1$ which now comprises the load current $I_o$ and the series LC current $I_{LC}$.

When the current $I_{LC}$ through the series LC 23 reaches a predetermined magnitude $I_{trip}$ at time (b), clamping switch CS1 is commanded off. Since the clamping switch CS1 is conductive when commanded off, the voltage thereacross is substantially zero. The $I_{trip}$ current, $I_{trip}$, is of a predetermined magnitude sufficient to overcome the losses associated with the system necessary for a full quasi-resonant rail swing.

In the present embodiment, it is preferred to estimate the time (b) at which the series LC current $I_{LC}$ achieves this trip current magnitude $I_{trip}$ after auxiliary switch AS2 is commanded on. This is readily estimated as the series LC current $I_{LC}$ is known to be a sinusoidal function of known quantities of source voltage $V_s$, resonant inductor 23A and resonant capacitor 23B, all of which quantities are known through direct sensing, calibration values and/or inverter control quantities. Although not necessary or preferred, such additional sensors as may be desired for direct measurement of current and voltage quantities may provide for sensed quantities for use in the determination of time (b).

The current and voltage responses to the gating sequence at times (a) and (b) of auxiliary switch AS2 and clamping switch CS1 results in the transfer of the current formerly carried as component $I_1$ through clamping switch CS1 to capacitors CC1,CC2 as shown in FIGS. 4A–4D. However, in contrast to a high current interrupt interval as illustrated in FIGS. 3A–3D wherein the series LC is not required to catalyze the swing of the quasi-resonant rail, the current responses and voltage responses are no longer exclusively linear. Rather, the effects of both capacitive and inductive reactances are found in the current and voltage responses between times (b) and (c). The voltage rise across switching element CS1 is still at an acceptably low dv/dt however characteristically non-linear.

Figure 4C:
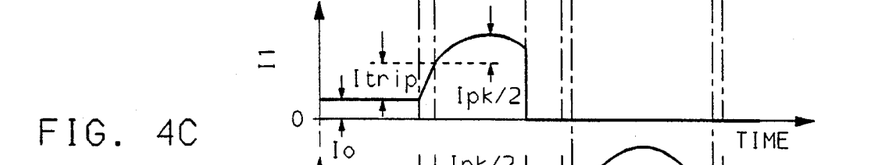
Figure 4D:
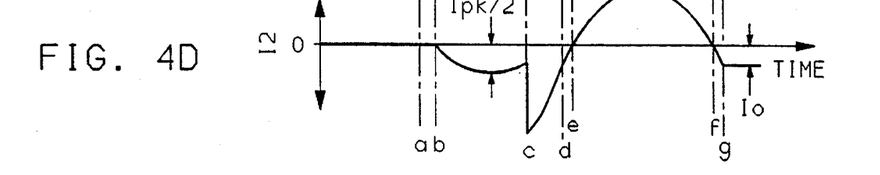

Continuing from time (b), after which the current $I_1$ formerly carried through clamping switch CS1 is shunted through the capacitors CC1,CC2, the output voltage $V_o$ swings toward the negative DC rail voltage as capacitor CC2 discharges and capacitor CC1 charges, while the series LC current $I_{LC}$ continues to increase negatively until it reaches a local negative maximum $I_{pk}$ in excess of the $I_{trip}$ current $I_{trip}$. The series LC current $I_{LC}$ is comprised of current components $I_1$ and $I_2$ less the load current $I_o$ as illustrated in FIGS. 4C and 4D. As the current through the series LC 23 decays from its peak, so too do the current components $I_1$ and $I_2$ decay therewith.

At time (c), the quasi-resonant rail attempts to overshoot the negative DC rail voltage thereby forward biasing clamping diode CD2. This effectively clamps the quasi-resonant rail to substantially the negative DC rail voltage. Since the respective voltages across capacitors CC1,CC2 are no longer changing with time, the current through each drops to zero. The currents formerly carried by capacitors CC1,CC2 corresponding to current components $I_1$ and $I_2$ as shown in FIGS. 4C and 4D, respectively, are immediately picked up through clamping diode CD2 as it is forward biased. This is shown in FIGS. 4C and 4D at time (c) whereat the current component $I_1$ drops to zero and is picked up through clamping diode CD2 and appears in current component $I_2$. This current component $I_2$ is essentially comprised of the load current $I_o$ and any remaining series LC current $I_{LC}$.

At a time substantially contemporaneous with or greater than time (c), wherein the downward swing of the quasi-resonant rail is complete and clamping diode CD2 is forward biased, an inverter state change may be accomplished at substantially zero voltage across the inverter switching elements. Also, clamping switch CS2 is preferably commanded on to take advantage of the substantially zero voltage thereacross (one diode drop) and the zero current therethrough. This commanding on of the switching element CS2 can be observed in FIG. 7D at time (c).

It is preferred to determine the time (c) by estimating the time needed for the combined capacitance of capacitors CC1,CC2 to substantially fully discharge and charge, respectively. This is readily estimated as the output voltage $V_o$ is known to be a sinusoidal function of the known quantities of load current $I_o$, capacitors CC1,CC2, resonant inductor 23A, resonant capacitor 23B and source voltage $V_o$. Again, all such quantities are known through direct sensing, calibration values and/or inverter control quantities. Although not necessary or preferred, such additional sensors as may be desired for direct measurement of current and voltage quantities may provide for sensed quantities for use in the determination of time (c).

At time (c), both ends of series LC 23 are at substantially zero volts, each end being clamped to the negative DC rail through one of the auxiliary switch AS2 or the clamping diode CD2. However, the natural resonance of the series LC 23 continues to sinusoidally force to series LC current $I_{LC}$ therethrough toward zero. Therefore, the auxiliary switch AS2 continues to conduct a freewheeling current therethrough until it reaches zero and reverses in accordance with the series LC resonance at time (d). Auxiliary diode AD2 thereby becomes forward biased at time (d) and the sinusoidally increasing series LC current $I_{LC}$ increasingly sources the load current, thereby supplanting the current through clamping diode CD2. When the series LC current resonates through the load current $I_o$ at time (e), clamping diode CD2 becomes reverse biased, and the portion of the series LC current in excess of the load current freewheels back through the clamping switch CS2.

At any time substantially contemporaneous with or greater than time (d), wherein the series LC current $I_{LC}$ has reversed and auxiliary diode AD2 is forward biased, auxiliary switch AS2 is preferably commanded off to take advantage of the substantially zero voltage thereacross (one diode drop) and the zero current therethrough. This commanding off of the auxiliary switch AS2 can be observed in FIG. 7D at time (d).

Although commanding on of clamping switch CS2 does not need to occur contemporaneously with the quasi-resonant rail reaching the negative DC rail voltage, it is necessary that it be commanded on while clamping diode CD2 is forward biased (i.e. prior to series LC current $I_{LC}$ resonating through $I_o$) in order to maintain the objective of zero voltage/zero current switching thereof. This is shown to be time (c) through time (e) in FIG. 4D. Likewise, commanding off of auxiliary switch AS2 does not need to occur contemporaneously with the series LC current reversal, however, it is necessary that it be commanded off while auxiliary diode AD2 is forward biased (i.e. series LC current greater than zero) in order to maintain the objective of zero voltage/zero current switching thereof. This is shown to be time (d) through time (g) in FIG. 4A. With reference to FIG. 1, and in particular to the control 60, it can be seen that the link 68 between logic blocks 65 and 66 would, within the same time window for commanding on clamping switch CS2, indicate that it is appropriate to allow for the passage of phase signals A, B and C to the appropriate output drivers at block 67 to thereby cause the desired soft switching of the appropriate inverter switch devices.

In completing a power interrupt interval, it is necessary to swing the quasi-resonant rail 27 back up to the positive DC rail voltage. This is accomplished in both cases of high and low current interrupt intervals in the same fashion utilizing a catalyzing current through series LC 23. Referring to FIGS. 5A–5D and either FIGS. 6A–6D or 7A–7D, such a swing of the quasi-resonant rail back up to the positive DC rail voltage is further explained.

Figures 5A, 5B:
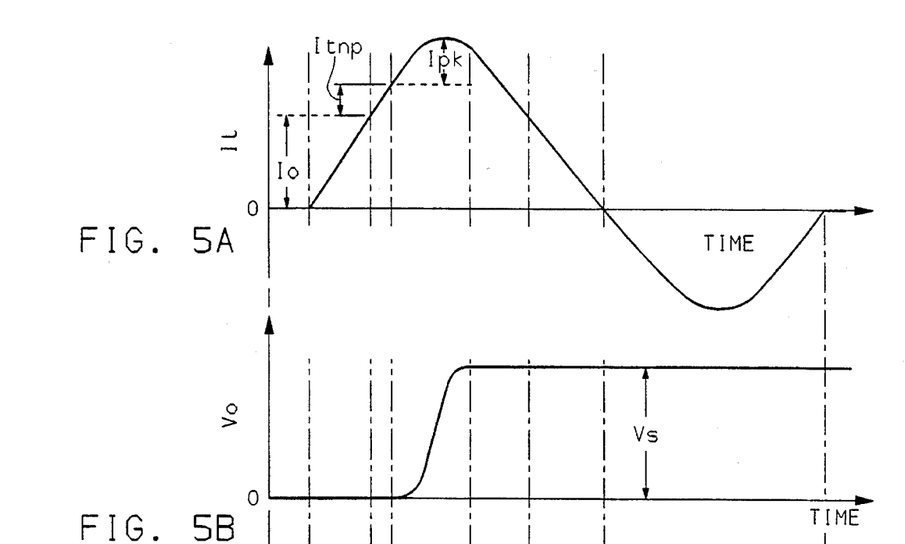
FIGS. 5A–5D illustrate various current and voltage signals during positive quasi-resonant rail swings.
Figure 5C:
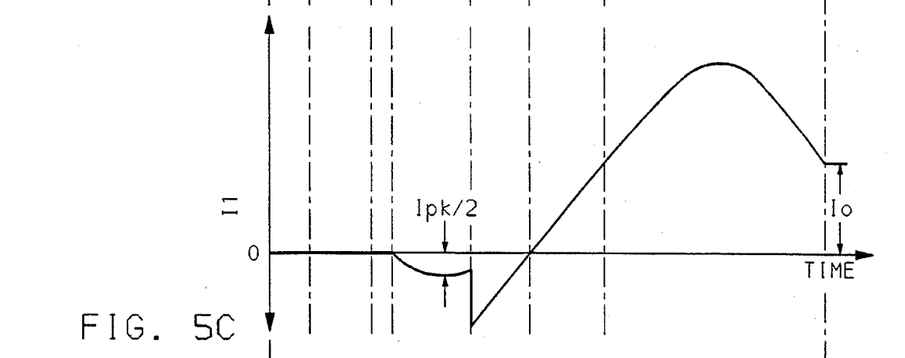
Figure 5D:
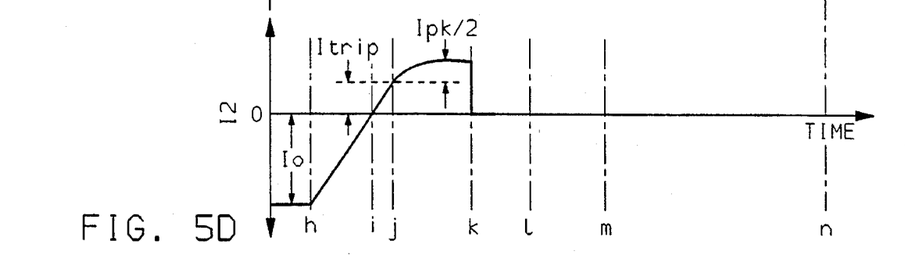
Figures 6A, 6B:
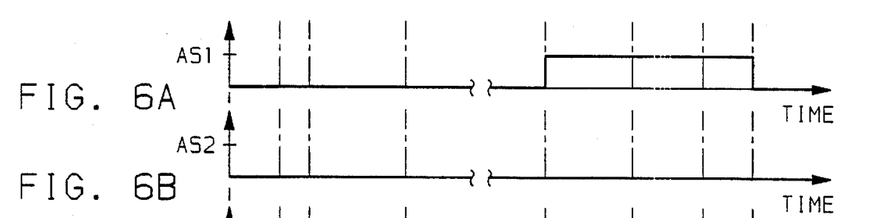
FIGS. 6A–6D illustrate various timing signals corresponding to the quasi-resonant rail swings illustrated in FIGS. 3A–3D and 5A–5D as applied to the various switching elements of the DC link.
Figure 6C:
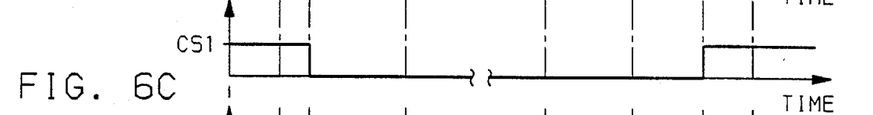
Figure 6D:
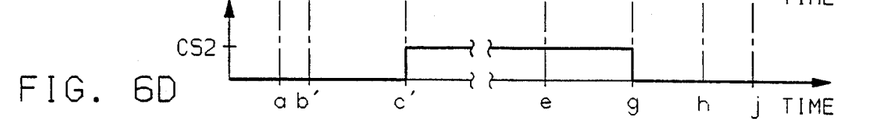
Figures 7A, 7B:
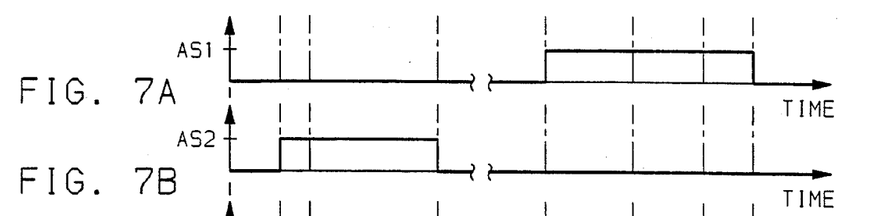
FIGS. 7A–7D illustrates various timing signals corresponding to the quasi-resonant rail swings illustrated in FIGS. 4A–4D and FIGS. 5A–5D as applied to the various switching elements of the DC link.
Figure 7C:
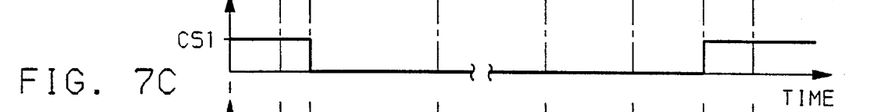
Figure 7D:
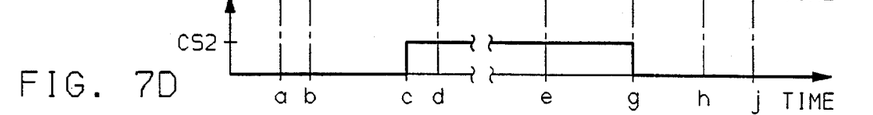

Initially, the current component $I_2$ (through clamping diode CD2) carries the entire load current $I_o$ illustrated in FIG. 5D. The current through series LC is assumed to be zero and thus the voltage thereacross is zero, both ends thereof being at substantially the negative DC rail voltage by virtue of the forward biased clamping diode CD2. At a time (h), auxiliary switch AS1 is commanded on thereby pulling up the one end of the series LC 23 connected between the auxiliary switches AS1,AS2 to substantially source voltage $V_s$.

Auxiliary switch AS1 sources the series LC current $I_{LC}$ as it increases from zero as illustrated in FIG. 5A at an acceptably low sinusoidal rate, thereby increasingly supplanting the current contribution to the load current $I_o$ carried through clamping diode CD2. At a time (i), the current through series LC 23 becomes equivalent to the load current $I_o$ and the current component $I_2$ is substantially zero. At this point, clamping diode CD2 is no longer carrying any current and becomes reverse biased.

Through time (i), the series LC current $I_{LC}$ continues to increase sinusoidally until time (j) whereat it reaches a predetermined value $I_{trip}$ in excess of the load current $I_o$. Since the load current $I_o$ remains constant, clamping switch CS2 sinks any current sourced through the series LC 23 in excess of the load current $I_o$ from time (i), whereat the clamping diode CD2 becomes reverse biased, to time (j), whereat the clamping switch CS2 is commanded off. The commanding off of clamping switch CS2 occurs during substantially zero voltage thereacross.

As with the catalyzed swing of the quasi-resonant rail to the negative DC rail voltage, the $I_{trip}$ current, $I_{trip}$, is of a predetermined magnitude sufficient to overcome the losses associated with the system. It is once again preferred to estimate the time (j) at which the series LC current $I_{LC}$ achieves this current magnitude $I_{trip}$ after auxiliary switch AS1 is commanded on. This is readily estimated as the series LC current $I_{LC}$ is known to be a sinusoidal function of known quantities of source voltage $V_s$, resonant inductor 23A and resonant capacitor 23B, all of which quantities are known through direct sensing, calibration values and/or inverter control quantities. Although not necessary or preferred, such additional sensors as may be desired for direct measurement of current and voltage quantities may provide for sensed quantities for use in the determination of time (j).

At time (j), the current component $I_2$ formerly carried through clamping switch CS2 is shunted through the capacitors CC1,CC2, and the output voltage $V_o$ swings toward the positive DC rail voltage as capacitor CC2 charges and capacitor CC1 discharges. The voltage rise across switching element CS2 occurs at an acceptably low dv/dt however characteristically non-linear. The series LC current $I_{LC}$ continues to increase positively until it reaches a local maximum $I_{pk}$ above the summation of the load current $I_o$ and $I_{trip}$ current $I_{trip}$. The series LC current $I_{LC}$ continues to source the load current $I_o$ and current in excess thereof to the capacitors CC1,CC2 as illustrated in FIGS. 5A, 5C and 5D. As the current through the series LC 23 resonates down from its peak, so too do the current components $I_1$ and $I_2$ decay therewith.

At time (k), the quasi-resonant rail attempts to overshoot the positive DC rail voltage thereby forward biasing clamping diode CD1. This effectively clamps the quasi-resonant rail to substantially the positive DC rail voltage. Since the respective voltages across capacitors CC1,CC2 are no longer changing with time, the current through each drops to zero. The currents formerly carried by capacitors CC1,CC2 are immediately picked up through clamping diode CD1 as it is forward biased. This is shown in FIGS. 5C and 5D at time (k) whereat the current component $I_2$ drops to zero and is picked up through clamping diode CD1 and appears in current component $I_1$. This current component $I_1$ is essentially comprised of any remaining series LC current $I_{LC}$ in excess of the load current $I_o$.

The series LC current $I_{LC}$ continues to source the load current $I_o$ with any current in excess thereof freewheeling back through the clamping diode CD1. At a time substantially contemporaneous with or greater than time (k), wherein the upward swing of the quasi-resonant rail is complete and clamping diode CD1 is forward biased, clamping switch CS1 is preferably commanded on to take advantage of the substantially zero voltage thereacross (one diode drop) and the zero current therethrough. This commanding on of the clamping switch CS1 can be observed in FIG. 7D at time (k).

The series LC current eventually resonates below the load current $I_o$ at time (l), and the clamping diode CD1 becomes reverse biased. Clamping switch CS1 therefore becomes conductive and increasingly sources the load current $I_o$ as the series LC current $I_{LC}$ continues to resonate toward zero. The series LC current ultimately resonates through zero at time (m) thereby reversing and freewheeling through clamping switch CS1 and auxiliary diode AD1 until it resonates once again to zero. Auxiliary switch AS1 is commanded off within the freewheel time (m–n), forward biased auxiliary diode AD1 thereby providing soft switching of auxiliary switch AS1 at substantially zero voltage/current conditions. This commanding off of auxiliary element AS1 can be observed in FIG. 7D at time (m).

Although commanding on of clamping switch CS1 does not need to occur contemporaneously with the quasi-resonant rail reaching the positive DC rail voltage, it is necessary that it be commanded on while clamping diode CD1 is forward biased (i.e. prior to series LC current $I_{LC}$ resonating through $I_o$) in order to maintain the objective of zero voltage/zero current switching thereof. This is shown to be time (k) through time (l) in FIG. 5C. Likewise, commanding off of auxiliary switch AS1 does not need to occur contemporaneously with the series LC current reversal, however, it is necessary that it be commanded off while auxiliary diode AD1 is forward biased (i.e. series LC current less than zero) in order to maintain the objective of zero voltage/zero current switching thereof. This is shown to be time (m) through time (n) in FIG. 5A.

It is noted here that the series LC 23 is required to carry a substantial current equivalent at its peak to the summation of the load current $I_o$, $I_{trip}$ current $I_{trip}$, and peak current $I_{pk}$ for a finite amount of time. However, this time is extremely small in comparison to the time in which the load current $I_o$ is carried by the switching elements CS1 and presents overall minimal energy dissipation through any power interrupt interval. Therefore, the series LC 23 may be selected suitably for transient current delivery.

Figure 2:
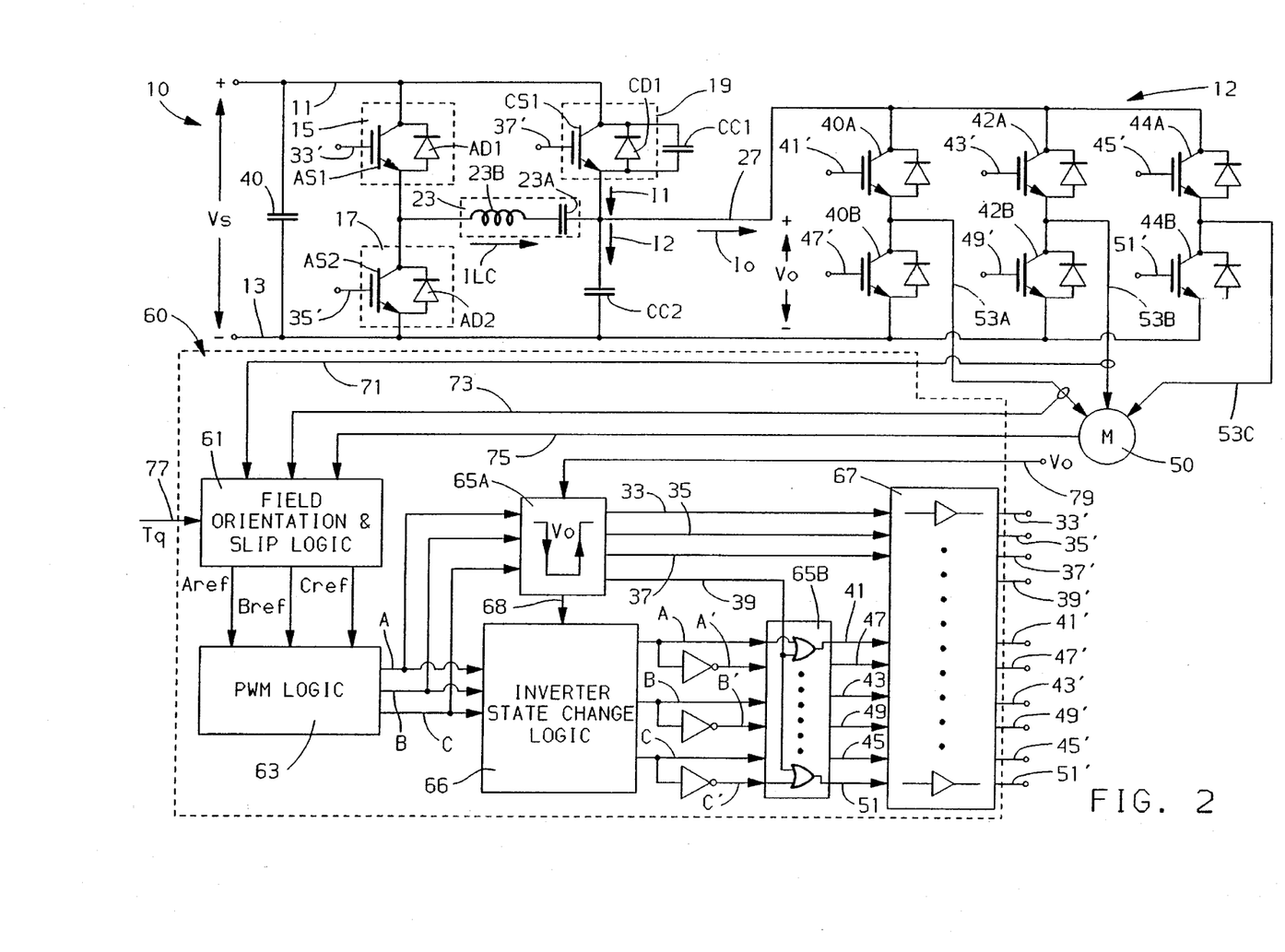
FIG. 2 illustrates schematically a second embodiment of a DC link with in association with an inverter coupled thereto.

An alternative embodiment of a DC link in accordance with the present invention is illustrated in FIG. 2. Numeric and alphabetic designations common between FIGS. 1 and 2 designate like features as between the respective embodiments. Features not specifically set forth in detail hereafter with respect to FIG. 2 may be considered as fully described previously with respect to the first embodiment of FIG. 1.

Numeral 10 generally designates the DC link having a DC source voltage $V_s$ toward the left of the illustration and a DC output voltage $V_o$ illustrated between the DC link 10 and the inverter 12. A single clamping switch device 19 is connected in between the positive DC rail 11 and the quasi-resonant rail 27.

Resonant capacitor CC2 is shown connected between the quasi-resonant rail 27 and the negative DC rail 13. This capacitor arrangement is the operative equivalent of the arrangement of capacitor CC2 illustrated in FIG. 1.

The inverter as shown in the present embodiment is a conventional three-phase AC to DC converter having a plurality of inverter switch devices 40A, 40B, 42A, 42B, 44A, and 44B. Each of these respective switch devices comprises a solid state inverter switch and an associated anti-parallel diode. Appropriate gate drive signals are applied to gates of the switching elements at 41', 43', 45', 47', 49' and 51'. In addition to the inverter state switching function performed by the switch devices 40–44, the switch devices further function as the operative equivalent of the lower clamping switch device 21 illustrated in FIG. 1 of the first embodiment. Commanding on of at least two inverter switch devices that are associated with a common output phase provides substantially equivalent operation to that which a dedicated lower clamping switch would provide. Preferably, all inverter switch devices 40–44 are commanded on when functioning to provide the equivalent operation of a dedicated lower clamping switch such that any shorted stator winding currents are distributed through all devices to distribute any stress.

Numeral 60 in the Figure illustrates generally a control for the DC link and the inverter switches. Blocks 65A and 65B are representative of DC link gating signal generation logic for providing appropriate DC link gate drive signals at 33'–37' and inverter gate drive signals at 41'–51' in accordance with the DC link required control thereof. Line 39 in the present embodiment is shown in logical "OR" arrangement with each phase (A–C) and inverted phase (A'–C') signal from the inverter state change logic block 66. A high logic signal on line 39 would therefore result in all inverter switch devices being commanded on in substantial functional equivalence to a dedicated lower clamping switch device. A low signal on line 39 would result in control of the inverter switch devices in accordance with the phase and inverted phase signals from the inverter state change logic block 66. A pair of inverter switch device in series becomes the substantial equivalent of a lower clamping diode (CD2 in FIG. 1) and as such presents a two diode voltage drop thereacross when forward biased. In high power applications this distinction becomes insignificant. Separate illustrations are not provided for gating signals and corresponding current and voltage responses for the alternative embodiment of FIG. 2, it being understood that gating signals illustrated in FIGS. 6D and 7D as applied to clamping switch CS2 in FIG. 1 correspond to the gating signals as applied to the inverter switch devices 40–44 in operative equivalence thereto, and the current and voltage responses corresponding to the alternative embodiment of FIG. 2 are substantially equivalent to those illustrated in FIGS. 3A–3D, 4A–4D and 5A–5D.

While the invention has been described with respect to certain preferred embodiments, such embodiments are to be taken by way of example and not of limitation. Therefore, the scope of the invention is to be limited only by the claims as presented herein.

The embodiments of the invention in which an exclusive property or privilege is claimed are defined as follows:

1. A DC link having a DC input and a DC output, the DC input coupled to a DC source and the DC output having substantially a first voltage during power delivery intervals and substantially a second voltage during power interrupt intervals, the DC link comprising:

the DC input comprising a positive DC rail at the first voltage and a negative DC rail at the second voltage;

the DC output comprising a quasi-resonant rail and the negative DC rail;

a first controlled switch connected between the positive DC rail and the quasi-resonant rail;

a second controlled switch connected between the negative DC rail and the quasi-resonant rail;

first and second diodes, the first diode coupled in anti-parallel across the first controlled switch and the second diode coupled in anti-parallel across the second controlled switch;

first and second capacitors, the first capacitor coupled across the first controlled switch and the second capacitor coupled across the second controlled switch;

a series coupled inductor and capacitor coupled having first and second ends, the first end thereof being coupled to the quasi-resonant rail;

a third controlled switch coupled between the positive DC rail and the second end of the series coupled inductor and capacitor;

a third diode coupled in anti-parallel across the third controlled switch; and a DC link control for executing power interrupt intervals intermediate power delivery intervals by sequentially commanding off the first controlled switch to release the quasi-resonant rail from the first voltage to thereby swing the quasi-resonant rail to the second voltage, commanding on the second controlled switch while the second diode is forward biased, commanding on the third controlled switch to catalyze a swing of the quasi-resonant rail to the first voltage, commanding off the second controlled switch to release the quasi-resonant rail from the second voltage to thereby swing the quasi-resonant rail to the first voltage, commanding on the first controlled switch while the first diode is forward biased, and commanding off the third controlled switch while the third diode is forward biased.

2. A DC link as claimed in claim 1 further comprising:

a fourth controlled switch coupled between the negative DC rail and the second end of the series inductor and capacitor;

a fourth diode coupled in anti-parallel across the fourth controlled switch; and the DC link control further executing power interrupt intervals by commanding on the fourth controlled switch prior to commanding off the first controlled switch to catalyze the swing of the quasi-resonant rail to the second voltage, and commanding off the fourth controlled switch while the fourth diode is forward biased.

3. A DC link having a DC input and a DC output, the DC input coupled to a DC source and the DC output coupled to an inverter at an input thereof, said DC output having substantially a first voltage during power delivery intervals and substantially a second voltage during power interrupt intervals, the inverter having a plurality of controlled inverter switches commutated during power interrupt intervals by an inverter control, each controlled inverter switch having an associated anti-parallel diode coupled thereacross, the DC link comprising:

the DC input comprising a positive DC rail at the first voltage and a negative DC rail at the second voltage;

the DC output comprising a quasi-resonant rail and the negative DC rail;

a first controlled switch connected between the positive DC rail and the quasi-resonant rail;

a first diode coupled in anti-parallel across the first controlled switch;

first and second capacitors, the first capacitor coupled across the first controlled switch and the second capacitor coupled between the quasi-resonant rail and the negative DC rail;

a series coupled inductor and capacitor having first and second ends, the first end thereof being coupled to the quasi-resonant rail;

a second controlled switch coupled between the positive DC rail and the second end of the series coupled inductor and capacitor;

a second diode coupled in anti-parallel across the second controlled switch; and a DC link control for executing power interrupt intervals intermediate power delivery intervals by sequentially commanding off the first controlled switch to release the quasi-resonant rail from the first voltage to thereby swing the quasi-resonant rail to the second voltage, commanding on at least two controlled inverter switches that are coupled in series across the inverter input while the associated anti-parallel diodes are forward biased, commanding on the second controlled switch to catalyze a swing of the quasi-resonant rail to the first voltage, commanding off all of the at least two controlled inverter switches not otherwise commanded on by the inverter control to release the quasi-resonant rail from the second voltage to thereby swing the quasi-resonant rail to the first voltage, commanding on the first controlled switch while the first diode is forward biased, and commanding off the second controlled switch while the second diode is forward biased.

4. A DC link as claimed in claim 3 further comprising:

a third controlled switch coupled between the negative DC rail and the second end of the series inductor and capacitor;

a third diode coupled in anti-parallel across the third controlled switch; and the DC link control further executing power interrupt intervals by commanding on the third controlled switch prior to commanding off the first controlled switch to catalyze the swing of the quasi-resonant rail to the second voltage, and commanding off the third controlled switch while the third diode is forward biased.

5. A DC link having a DC input and a DC output, the DC input coupled to a DC source and the DC output coupled to an inverter at an input thereof, said DC output having substantially a first voltage during power delivery intervals and substantially a second voltage during power interrupt intervals, the inverter having a plurality of controlled inverter switches commutated during power interrupt intervals by an inverter control, each controlled inverter switches having an associated anti-parallel diode coupled thereacross, the DC link comprising:

the DC input comprising a positive DC rail at the first voltage and a negative DC rail at the second voltage;

the DC output comprising a quasi-resonant rail and the negative DC rail;

a first controlled switch connected between the positive DC rail and the quasi-resonant rail;

a first diode coupled in anti-parallel across the first controlled switch;

first and second capacitors, the first capacitor coupled across the first controlled switch and the second capacitor coupled between the quasi-resonant rail and the negative DC rail;

a series coupled inductor and capacitor having first and second ends, the first end thereof being coupled to the quasi-resonant rail;

a second controlled switch coupled between the positive DC rail and the second end of the series coupled inductor and capacitor;

a second diode coupled in anti-parallel across the second controlled switch;

controlled switch means connected between the quasi-resonant rail and the negative DC rail;

rectifier means connected in anti-parallel across the controlled switch means; and a DC link control for executing power interrupt intervals intermediate power delivery intervals by sequentially commanding off the first controlled switch to release the quasi-resonant rail from the first voltage to thereby swing the quasi-resonant rail to the second voltage, commanding on the controlled switch means while the rectifier means, is conducting, commanding on the second controlled switch to catalyze a swing of the quasi-resonant rail to the first voltage, commanding off the controlled switch means to release the quasi-resonant rail from the second voltage to thereby swing the quasi-resonant rail to the first voltage, commanding on the first controlled switch while the first diode is forward biased, and commanding off the second controlled switch while the second diode is forward biased.

6. A DC link as claimed in claim 5 further comprising:

a third controlled switch coupled between the negative DC rail and the second end of the series inductor and capacitor;

a third diode coupled in anti-parallel across the third controlled switch; and the DC link control further executing power interrupt intervals by commanding on the third controlled switch prior to commanding off the first controlled switch to catalyze the swing of the quasi-resonant rail to the second voltage, and commanding off the third controlled switch while the third diode is forward biased.

7. A DC link as claimed in claim 5 wherein the controlled switch means comprises a third controlled switch.

8. A DC link as claimed in claim 5 wherein the controlled switch means comprises at least two controlled inverter switches that are coupled in series across the inverter input.

9. A DC link as claimed in claim 5 wherein the rectifier means comprises a third diode.

10. A DC link as claimed in claim 6 wherein the controlled switch means comprises a fourth controlled switch.

11. A DC link as claimed in claim 6 wherein the controlled switch means comprises at least two controlled inverter switches that are coupled in series across the inverter input.

12. A DC link as claimed in claim 6 wherein the rectifier means comprises a fourth diode.

13. A method of operating a DC link having a DC input and a DC output, the DC input coupled to a DC source and the DC output coupled to an inverter at an input thereof, the DC input comprising a positive DC rail at a first voltage and a negative DC rail at a second voltage, the DC output comprising a quasi-resonant rail and the negative DC rail, the inverter comprising a plurality of controlled inverter switches, the DC link comprising a first controlled switch connected between the positive DC rail and the quasi-resonant rail, a first diode coupled in anti-parallel across the first controlled switch, first and second capacitors, the first capacitor coupled across the first controlled switch and the second capacitor coupled between the quasi-resonant rail and the negative DC rail, a series coupled inductor and capacitor having first and second ends, the first end thereof coupled to the quasi-resonant rail, a second controlled switch coupled between the positive DC rail and the second end of the series coupled inductor and capacitor, a second diode coupled in anti-parallel across the second controlled switch, controlled switch means connected between the quasi-resonant rail and the negative DC rail, and rectifier means connected in anti-parallel across the controlled switching means, the method comprising the steps of:

commanding off the first controlled switch to swing the quasi-resonant rail to the second voltage;

commanding on the controlled switch means while the rectifier means is conducting;

commanding on the second controlled switch to catalyze a swing of the quasi-resonant rail to the first voltage;

commanding off the controlled switch means to swing the quasi-resonant rail to the first voltage;

commanding on the first controlled switch while the first diode is forward biased; and commanding off the second controlled switch while the second diode is forward biased.

14. A method of operating a DC link as claimed in claim 13 wherein the DC link further comprises a third controlled switch coupled between the negative DC rail and the second end of the series coupled inductor and capacitor, and a third diode coupled in anti-parallel across the third controlled switch, the method further comprising the steps of:

commanding on the third controlled switch prior to commanding off the first controlled switch to catalyze the swing of the quasi-resonant rail to the second voltage; and commanding off the third controlled switch while the third diode is forward biased.

\* \* \* \* \*